United States Patent
Maeda

(10) Patent No.: US 10,819,218 B2
(45) Date of Patent: Oct. 27, 2020

(54) POWER CONVERTER FOR ELECTRIC VEHICLE

(71) Applicant: TOYOTA JIDOSHA KABUSHIKI KAISHA, Toyota-shi, Aichi (JP)

(72) Inventor: Hideki Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/544,989

(22) Filed: Aug. 20, 2019

(65) Prior Publication Data
US 2020/0099286 A1     Mar. 26, 2020

(30) Foreign Application Priority Data

Sep. 25, 2018    (JP) ................................ 2018-179389

(51) Int. Cl.
     *H02P 27/06*       (2006.01)
     *H02M 1/32*        (2007.01)
     *H02M 3/156*      (2006.01)

(52) U.S. Cl.
     CPC ............ *H02M 1/32* (2013.01); *H02M 3/156* (2013.01); *H02P 27/06* (2013.01); *H02M 2001/327* (2013.01)

(58) Field of Classification Search
     CPC ..... H02M 2001/007; H02M 2001/008; H02M 2001/0009; H02M 7/003; H02M 1/08; H02M 7/5387; H02M 1/32; H02P 27/06; H02P 5/46

See application file for complete search history.

(56) References Cited

U.S. PATENT DOCUMENTS

| | | | | |
|---|---|---|---|---|
| 8,306,720 B2 * | 11/2012 | Yamazaki | ............ | B60W 20/15 701/103 |
| 8,829,857 B2 * | 9/2014 | Minamiura | ......... | H01M 10/482 320/136 |
| 8,855,851 B2 * | 10/2014 | Nishizawa | .......... | B60L 15/2009 701/29.5 |
| 2012/0274137 A1 * | 11/2012 | Yoshida | ................. | B60L 58/30 307/43 |

FOREIGN PATENT DOCUMENTS

| JP | 2013-5550 A | 1/2013 |
|---|---|---|
| JP | 2013-48515 A | 3/2013 |

* cited by examiner

*Primary Examiner* — Rina I Duda
(74) *Attorney, Agent, or Firm* — Oliff PLC

(57) ABSTRACT

A power converter for an electric vehicle that converts output of a battery to driving an electric traction motor is disclosed. The power converter may include: a power switching element; a current sensor provided on a bus bar in which an output current of the switching element flows; a cooler cooling the switching element; a temperature sensor measuring a temperature of a coolant; and a controller controlling the switching element. The controller may be configured to: estimate a temperature of the current sensor based on the temperature of the coolant; determine a first and second correction values for the estimated temperature based on the output current and an input voltage applied to the switching element; and restrict a load on the switching element when a corrected temperature, which is obtained by adding the first and second correction values to the estimated temperature, exceeds a predetermined temperature threshold.

3 Claims, 8 Drawing Sheets

FIG. 7

| Coolant Temperature Tw | Estimated Temperature Te | Cooler Comtribution Tc | Atmospheric Temperature Contribution Ta |
|---|---|---|---|
| Tw1 | Te1 | Tc1 | Ta1 |
| Tw2 | Te2 | Tc2 | Ta2 |
| Tw3 | Te3 | Tc3 | Ta3 |
| Tw4 | Te4 | Tc4 | Ta4 |
| Tw5 | Te5 | Tc5 | Ta5 |
| Tw6 | Te6 | Tc6 | Ta6 |
| Tw7 | Te7 | Tc7 | Ta7 |
| Tw8 | Te8 | Tc8 | Ta8 |
| Tw9 | Te9 | Tc9 | Ta9 |

| Output Current Im | First Correction Value dT1 | Bus Bar Contribution Tb | Resin Contribution Tr |
|---|---|---|---|
| Im1 | dT11 | Tb1 | Tr1 |
| Im2 | dT12 | Tb2 | Tr2 |
| Im3 | dT13 | Tb3 | Tr3 |
| Im4 | dT14 | Tb4 | Tr4 |
| Im5 | dT15 | Tb5 | Tr5 |
| Im6 | dT16 | Tb6 | Tr6 |
| Im7 | dT17 | Tb7 | Tr7 |
| Im8 | dT18 | Tb8 | Tr8 |
| Im9 | dT19 | Tb9 | Tr9 | dT1 = Tb +Tr

FIG. 9

| Input Voltage VH | Second Correction Value dT2 |
|---|---|
| VH1 | dT21 |
| VH2 | dT22 |
| VH3 | dT23 |
| VH4 | dT24 |
| VH5 | dT25 |
| VH6 | dT26 |
| VH7 | dT27 |
| VH8 | dT28 |
| VH9 | dT29 |

POWER CONVERTER FOR ELECTRIC VEHICLE

CROSS-REFERENCE TO RELATED APPLICATION

This application claims priority to Japanese Patent Application No. 2018-179389 filed on Sep. 25, 2018, the contents of which are hereby incorporated by reference into the present application.

TECHNICAL FIELD

The teaching disclosed herein relates to a power converter configured to convert output electric power of a power source to driving electric power for an electric traction motor.

BACKGROUND

An electric vehicle includes a power converter that converts output electric power of a power source to driving electric power for an electric traction motor. Examples of the electric vehicle described herein include a hybrid vehicle equipped with both an electric traction motor and an engine, a vehicle equipped with a fuel cell as a power source for an electric traction motor, and the like. A typical power converter is an inverter that converts direct-current power to alternating-current power. In some cases, such a power converter may include a boost converter that boosts a voltage of direct-current power in advance of the inverter (for example, Japanese Patent Application Publication No. 2013-48515). Hereinbelow, an electric traction motor may be simply referred to as a motor.

A power converter includes many switching elements for power conversion. The switching elements for power conversion may be called power switching elements. The switching elements for power conversion generate a large amount of heat because they deal with high electric power. In order to effectively use the switching elements while avoiding overheating of the switching elements, it is important to know temperature of the switching elements. Japanese Patent Application Publication No. 2013-48515 describes a technique of estimating a temperature of a switching element from a current flowing through the switching element and a voltage applied to the switching element. Estimating a temperature of a switching element eliminates the necessity of a temperature sensor.

In addition, a power converter includes a current sensor that measures an output current in order to appropriately supply a target current to a motor. An elongated metal plate (or a metal bar), which is called a bus bar, is connected to an output end of a switching element. The bus bar transmits an output current from the switching element. In a power converter described in Japanese Patent Application Publication No. 2013-5550, a current sensor is attached to such a bus bar.

SUMMARY

Heat of a switching element transfers to a current sensor via a bus bar. If the current sensor becomes unusable because of overheating, appropriate electric power may not be supplied to a motor. Therefore, thermal protection for the current sensor is also important. The disclosure herein provides a technique of protecting a current sensor from heat in a power converter that supplies electric power to an electric traction motor. In particular, the disclosure herein provides a technique of protecting the current sensor from heat without any temperature sensor dedicated for measuring the temperature of the current sensor.

A power converter disclosed herein is a power converter for an electric vehicle and is a device configured to convert output electric power of a power source to driving electric power for an electric traction motor. The power converter may include a switching element, a cooler, a current sensor, a temperature sensor, and a controller. The switching element may be configured to convert the output electric power of the power source to the driving electric power for the motor. The current sensor may be configured to measure an output current of the switching element. The current sensor may be provided on a bus bar in which the output current of the switching element flows. The cooler may be configured to cool the switching element. The temperature sensor may be configured to measure a temperature of a coolant for the cooler (a coolant temperature). The controller may be configured to control the switching element. The controller may be configured to estimate a temperature of the current sensor based on the coolant temperature. That temperature is referred to as an estimated temperature. The controller may be configured to determine a first correction value for the estimated temperature based on the output current of the switching element and determine a second correction value for the estimated temperature based on an input voltage applied to the switching element. The first correction value and the second correction value each correspond to a temperature increase in the current sensor caused by the amount of heat applied to the current sensor from the switching element via the bus bar. The controller may be configured to add the first correction value and the second correction value to the estimated temperature to obtain a corrected temperature. The controller may be configured to restrict a load on the switching element when the corrected temperature exceeds a predetermined temperature threshold.

Restricting the load on the switching element reduces the amount of heat applied to the current sensor from the switching element via the bus bar, so the current sensor is prevented from overheating. The temperature of the current sensor can be accurately estimated by considering the output current and the input voltage of the switching element in addition to the coolant temperature. The power converter disclosed herein can accurately estimate the temperature of the current sensor without using a dedicated temperature sensor for measuring the temperature of the current sensor and can protect the current sensor from heat appropriately.

The details and further improvement of the technique disclosed herein will be described in the section "DETAILED DESCRIPTION".

BRIEF DESCRIPTION OF DRAWINGS

FIG. 7 is an example of a first map.

FIG. 8 is an example of a second map.

FIG. 9 is an example of a third map.

DETAILED DESCRIPTION

Figure 1:
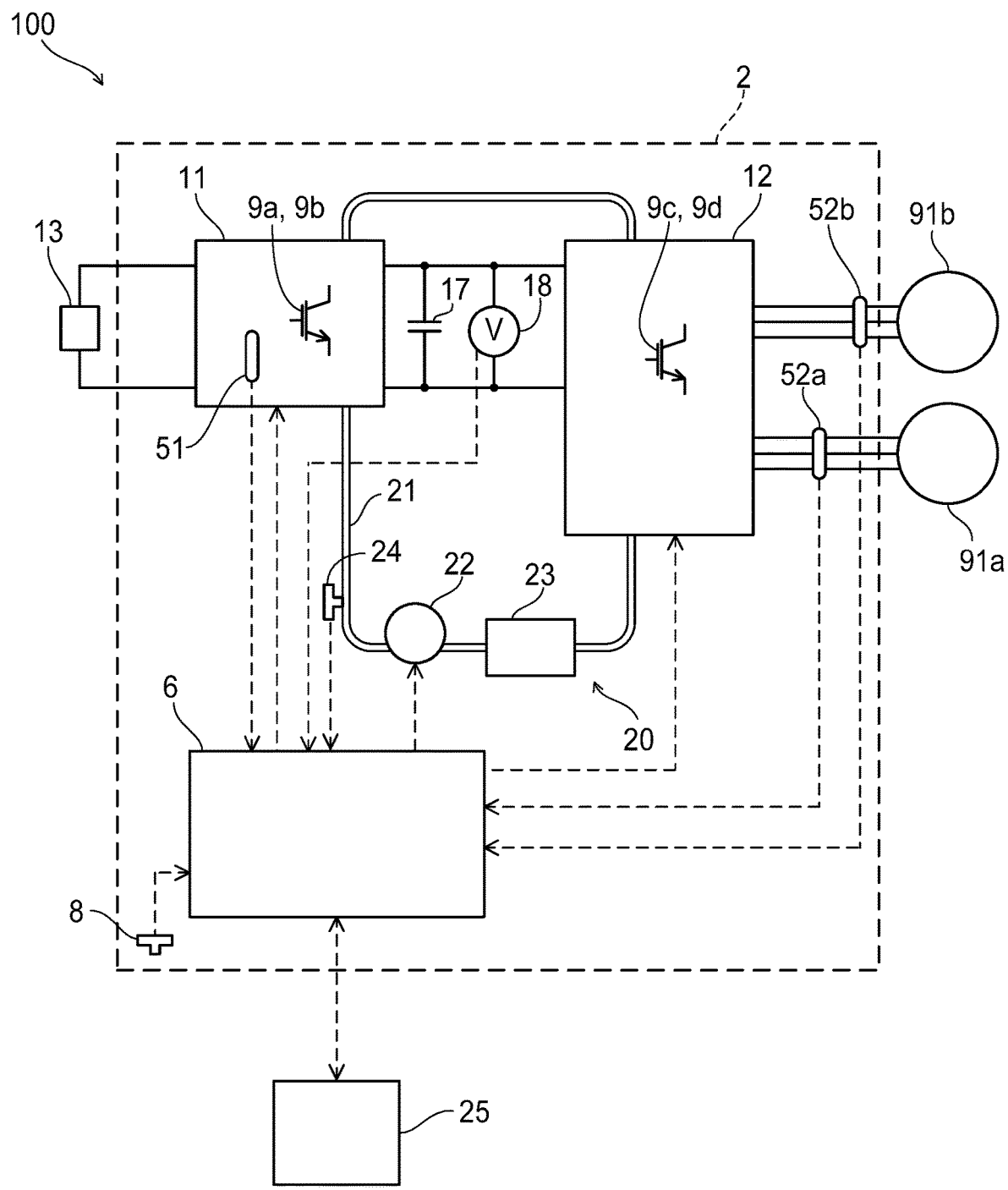
FIG. 1 is a block diagram for a power system of an electric vehicle including a power converter according to an embodiment.

A power converter 2 according to an embodiment will be described referring to the drawings. The power converter 2 is mounted in an electric vehicle 100. FIG. 1 is a block diagram for a power system of the electric vehicle 100 including the power converter 2. The electric vehicle 100 includes two motors 91a and 91b for driving wheels.

The electric vehicle 100 includes a direct-current power source 13, the power converter 2, and a host controller 25, in addition to the two motors 91a and 91b. The direct-current power source 13 is a lithium-ion battery. The power converter 2 converts output electric power of the direct-current power source 13 to driving electric power for the motors 91a and 91b. The motors 91a and 91b are three-phase alternating-current motors. The power converter 2 boosts an output voltage of the direct-current power source 13 and converts boosted electric power to three-phase alternating current.

The power converter 2 includes a voltage converter 11, an inverter 12, a cooler 20, and a controller 6. The voltage converter 11 is a bidirectional DC-DC, converter of chopper type. The voltage converter 11 boosts the voltage of the direct-current power source 13 and supplies it to the inverter 12. The voltage converter 11 can also step down a voltage of regenerative electric power generated by the motors 91a and 91b to the voltage of the direct-current power source 13 (after the inverter 12 converts the regenerative electric power to direct-current electric power).

The voltage converter 11 of chopper type includes a plurality of switching elements 9a and 9b, and also includes a reactor and a capacitor. A circuit configuration of the voltage converter 11 will be described later referring to FIG. 2. In FIG. 1, the voltage converter 11 is schematically illustrated as including the switching elements 9a and 9b, and a current sensor 51. The current sensor 51 measures a current flowing through the reactor (to be described later). Broken arrows in FIG. 1 each represent a flow of a signal. Measurement data in the current sensor 51 is sent to the controller 6. The switching elements 9a and 9b are operated by instructions from the controller 6. A smoothing capacitor 17 and a voltage sensor 18 are provided on an output side of the voltage converter 11. The voltage sensor 18 measures an output voltage of the voltage converter 11 (an input voltage to the inverter 12). A measured value in the voltage sensor 18 is sent to the controller 6.

The inverter 12 includes two inverter circuits. The inverter circuits convert the direct-current electric power, of which voltage was boosted by the voltage converter 11, to alternating-current electric power for driving the motors 91a and 91b. A configuration of the inverter circuits will be described later referring to FIG. 2. In FIG. 1, the inverter 12 is schematically illustrated as including switching elements 9c and 9d. The switching elements 9c and 9d of the inverter 12 are also operated by instructions from the controller 6.

An alternating current supplied from the inverter 12 to the motor 91a (91b) is measured by a current sensor 52a (52b). Measured values in the current sensors 52a and 52b are also sent to the controller 6.

The controller 6 receives a target output instruction for the motors 91a and 91b from the host controller 25. The controller 6 performs feed-back control on the switching elements 9a, 9b, 9c, and 9d of the voltage converter 11 and the inverter 12 based on the measured values in the respective sensors such that the received target output instruction is achieved. The host controller 25 determines target outputs for the motors 91a and 91b based on an accelerator position, a vehicle speed, a remaining amount of power in the direct-current power source 13 and the like, and transmits an instruction thereof (the target output instruction) to the controller 6.

The power converter 2 also includes the cooler 20 that cools the switching elements 9a and 9b of the voltage converter 11, the switching elements 9c and 9d of the inverter 12, the reactor of the voltage converter 11, and the like. The cooler 20 includes a circulation path 21 in which a coolant flows, a radiator 23, a pump 22, and a temperature sensor 24. The circulation path 21 passes through the voltage converter 11, the inverter 12, and the radiator 23. The switching elements 9a and 9b of the voltage converter 11 and the switching elements 9c and 9d of the inverter 12 are placed in one unit, and the coolant is delivered to the unit, which will be described later. The unit includes a plurality of cooling tubes (to be described later) and the cooling tubes correspond to a part of the circulation path 21. The pump 22 feeds the coolant that has passed through the radiator 23 to the above-described cooling tubes. The temperature sensor 24 measures a temperature of the coolant before it is fed to the cooling tubes. The coolant may be water or antifreeze. The pump 22 is controlled by the controller 6. The controller 6 appropriately controls the pump 22 (that is, controls a flow rate of the coolant) to prevent overheating of the switching elements 9a, 9b, 9c, and 9d.

The power converter 2 also includes a temperature sensor 8 that measures an atmospheric temperature. A measured value in the temperature sensor 8 is also sent to the controller 6.

Figure 2:
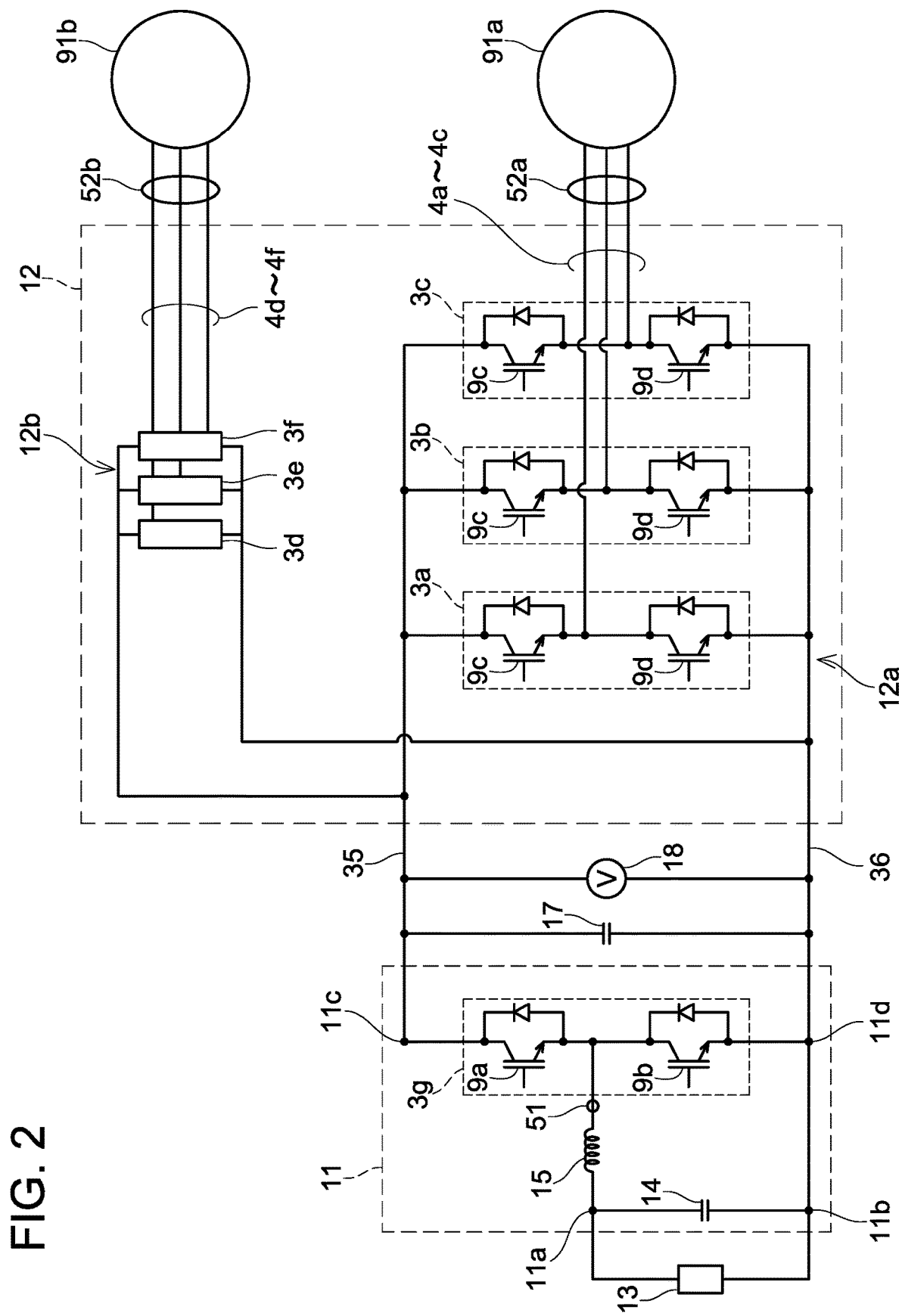
FIG. 2 is a circuit diagram for a voltage converter and an inverter.

FIG. 2 is a circuit diagram of the voltage converter 11 and the inverter 12. The voltage converter 11 includes the two switching elements 9a and 9b, two diodes, a reactor 15, and a filter capacitor 14. The two switching elements 9a and 9b are connected in series between a high-voltage-end positive electrode 11c and a high-voltage-end negative electrode 11d of the voltage converter 11. The diodes are connected in antiparallel with the respective switching elements. The reactor 15 is connected between a middle point of the series connection of the two switching elements 9a and 9b and a low-voltage-end positive electrode 11a. The current sensor 51 is provided between the middle point of the series connection and the reactor 15. The current sensor 51 measures a current flowing through the reactor 15, that is, a current flowing in the voltage converter 11. The filter capacitor 14 is connected between the low-voltage-end positive electrode 11a and a low-voltage-end negative electrode 11b. The low-voltage-end negative electrode 11b and the high-voltage-end negative electrode 11d are directly connected to each other. A broken line that surrounds the two switching elements 9a and 9b and the diodes represents a semiconductor module 3g. The semiconductor module 3g will be described later.

As described before, the voltage converter 11 in FIG. 2 is a bidirectional DC-DC converter. The voltage converter 11 in FIG. 2 is well known, and therefore a description of an operation thereof is omitted.

The inverter 12 includes two inverter circuits 12a and 12b. The inverter circuit 12a will be described. The inverter circuit 12a has a circuit configuration in which three series connections of two switching elements 9c and 9d are connected in parallel to one another. A diode is connected in antiparallel with each of the switching elements 9c and 9d. Broken lines 3a to 3c each represent a semiconductor module. Each of the semiconductor modules 3a to 3c accommodates therein the series connection of the two switching elements 9c and 9d and the diodes respectively connected in antiparallel with those switching elements 9c and 9d.

The three semiconductor modules 3a to 3c, that is, the three series connections of the switching elements 9c and 9d, are connected in parallel to one another between a positive line (a positive bus bar 35) and a negative line (a negative bus bar 36). An alternating current is outputted from a middle point of each of the three series connections. The outputs from the three series connections, that is, output currents from the inverter circuit 12a, are sent to the motor 91a through output bus bars 4a to 4c and a power cable (not illustrated). A bus bar is a conductor that is suitable for transmitting a large current. The bus bar is configured by a copper plate, for example.

The inverter circuit 12b has the same configuration as the inverter circuit 12a. Each of three semiconductor modules 3d to 3f accommodates a series connection of the two switching elements 9c and 9d, although this is not illustrated. A diode is connected in antiparallel with each of those switching elements 9c and 9d. An alternating current for driving the motor 91b is outputted from a middle point of each of the three series connection. Output currents from the three series connections are sent to the motor 91b through output bus bars 4d to 4f and a power cable (not illustrated), respectively.

The current sensor 52a is provided on the output bus bars 4a to 4c, and the current sensor 52b is provided on the output bus bars 4d to 4f. The current sensor 52a measures currents flowing through the output bus bars 4a to 4c, and the current sensor 52b measures currents flowing through the output bus bars 4d to 4f. The measured currents are sent to the controller 6 (see FIG. 1). The current sensors 52a and 52b measure output currents of the switching elements 9c and 9d.

The switching elements 9a to 9d are transistors for power conversion (power transistors). The switching elements 9a to 9d are IGBTs (Insulated Gate Bipolar Transistors), for example.

Reference signs 3a to 3g in FIG. 2 represent semiconductor modules. Hereinbelow, when any one of the semiconductor modules 3a to 3g is described without being distinguished from the others, it will be referred to as a semiconductor module 3. One semiconductor module 3 accommodates therein the two switching elements 9a and 9b (or 9c and 9d) and the diodes connected in antiparallel with the respective switching elements. A main body of the semiconductor module 3 is a resin package, and the two switching elements 9a and 9b (or 9c and 9d) are connected in series in the resin package.

Figure 3:
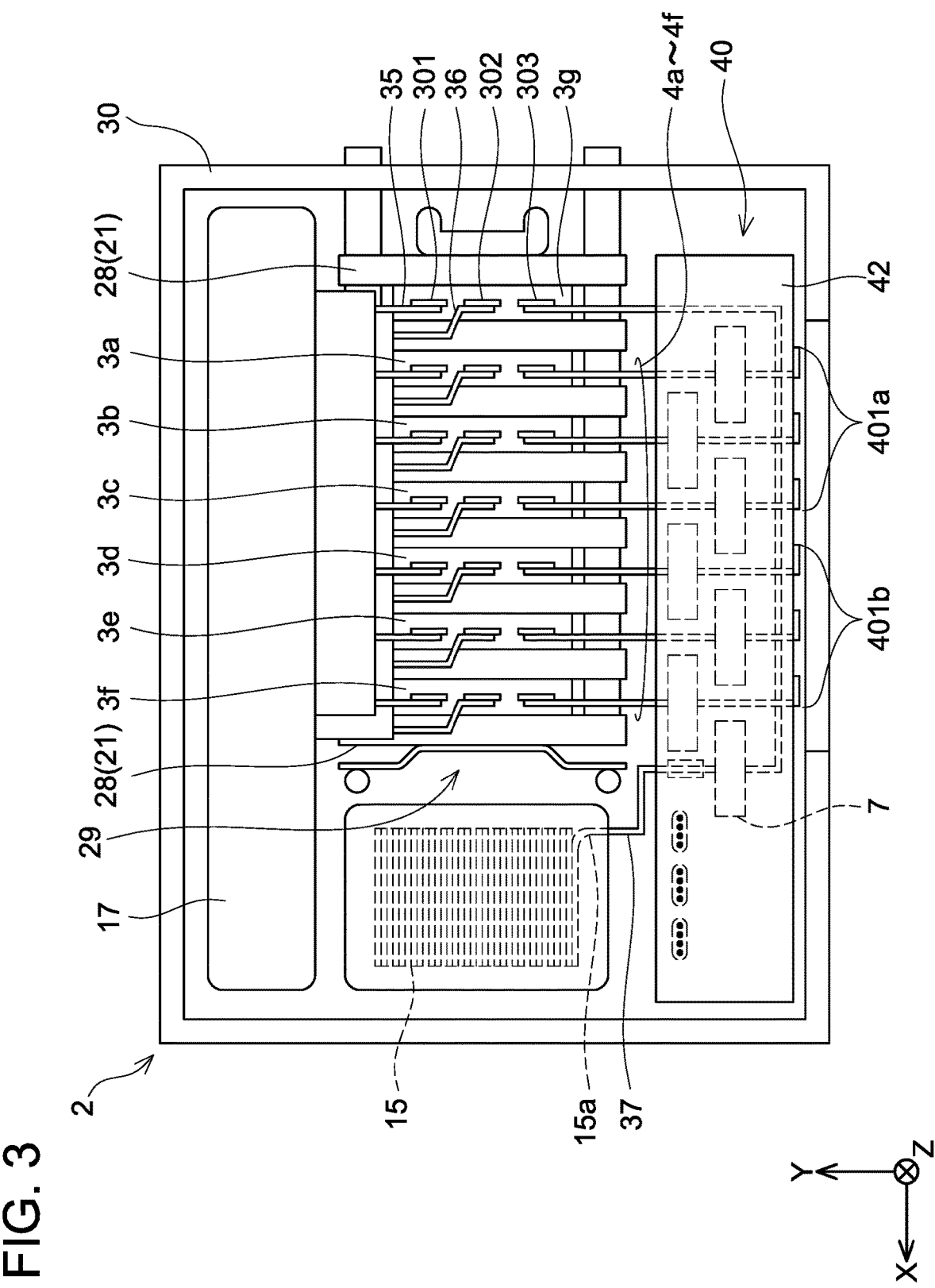
FIG. 3 is a bottom view of the power converter.
Figure 4:
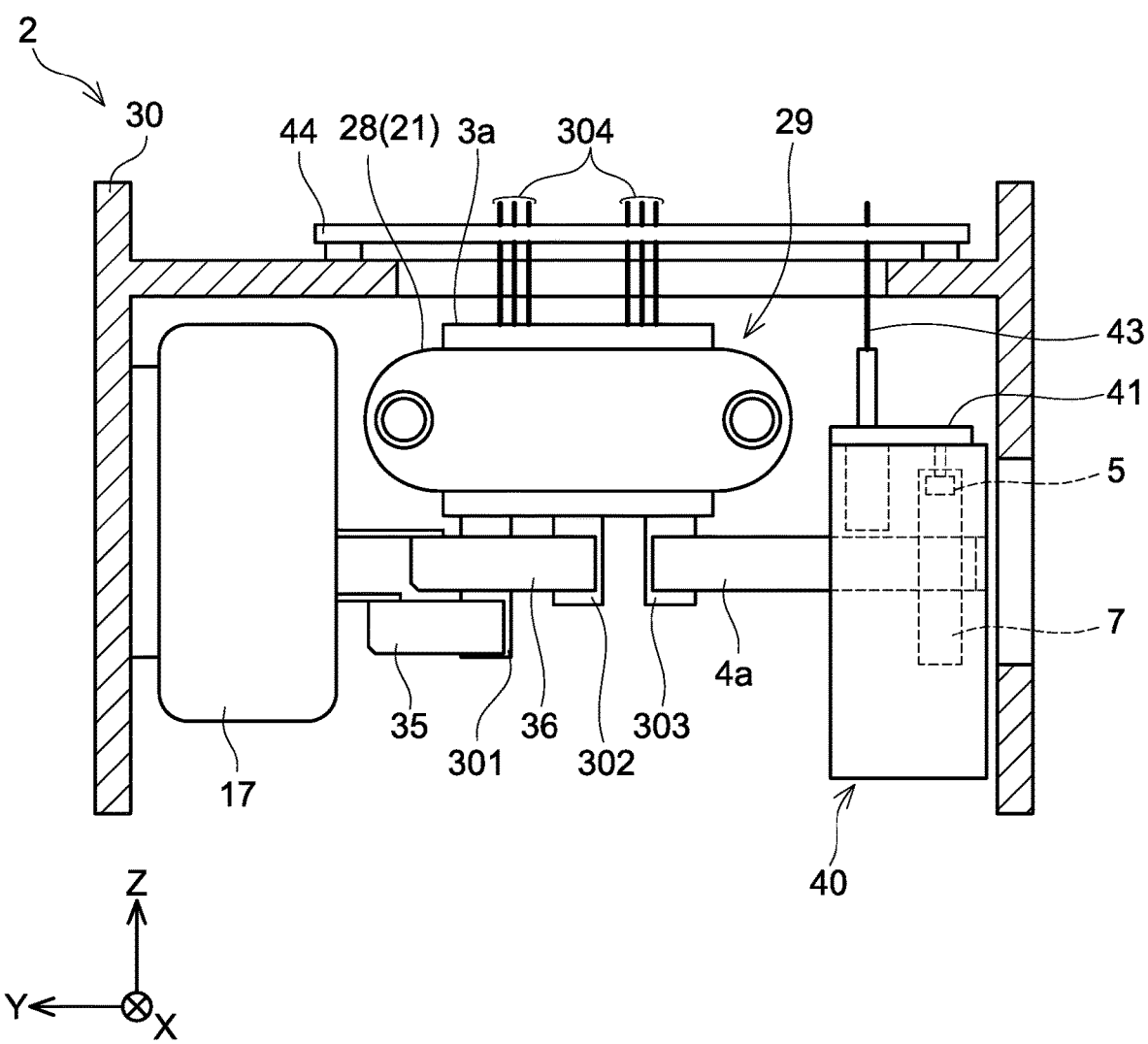
FIG. 4 is a front view of the power converter.

Next, a hardware configuration of the power converter 2 will be described referring to FIGS. 3 to 5. FIG. 3 is a bottom view of the power converter 2, in which a bottom of a case 30 is omitted. FIG. 4 is a front view of the power converter 2, in which a front plate of the case 30 is omitted. The portions of the case 30 are omitted in FIGS. 3 and 4 to allow a components layout in the case to be seen.

The semiconductor modules 3a to 3g, each of which accommodates therein the switching elements 9a and 9b (9c and 9d), configure a stacked unit 29 together with the plurality of cooling tubes 28. In FIG. 3, the cooling tubes at both ends of the stacked unit 29 are labeled with the reference sign 28, but the other cooling tubes are not labeled. The cooling tubes 28 correspond to the afore-described circulation path 21 of the cooler 20. The semiconductor modules 3a to 3g and the cooling tubes 28 are alternately stacked one by one, and the cooling tubes 28 are in contact with both sides of each of the semiconductor modules 3a to 3g. The coolant flows in the cooling tubes 28 to cool the semiconductor modules 3 that are in contact therewith.

A positive terminal 301, a negative terminal 302, an output terminal 303, and control terminals 304 extend from the main body of each semiconductor module 3. As described before, the series connection of the two switching elements 9a and 9b (9c and 9d) is accommodated in the main body of each semiconductor module 3. The positive terminal 301, the negative terminal 302, and the output terminal 303 are respectively connected to a positive electrode, a negative electrode, and the middle point of series connection of the two switching elements 9a and 9b (9c and 9d). In FIG. 3, the reference signs 301, 302, and 303 are given to terminals of the rightmost semiconductor module 3g, while the reference signs are omitted for terminals of the other semiconductor modules 3a to 3f.

The control terminals 304 are connected to gates and sense emitters of the switching elements 9a and 9b (9c and 9d) in the semiconductor modules 3, for example. Ends of the control terminals 304 are connected to a circuit board 44. The circuit board 44 has the controller 6 illustrated in FIG. 1 mounted thereon. The controller 6 controls the switching elements 9a and 9b (9c and 9d) in the semiconductor modules 3 via the control terminals 304.

The smoothing capacitor 17 is adjacent to the stacked unit 29 in a +Y-direction in FIGS. 3 and 4. The reactor 15 is adjacent to the stacked unit 29 in a +X-direction in FIGS. 3 and 4.

The positive terminals 301 of the semiconductor modules 3a to 3g are connected to one electrode of the smoothing capacitor 17 by the positive bus bar 35, while the negative terminals 302 are connected to another electrode of the smoothing capacitor 17 by the negative bus bar 36. One end 15a of the reactor 15 is connected to the output terminal 303 of the semiconductor module 3g by a relay bus bar 37. The output terminal 303 of the semiconductor module 3g corresponds to the middle point of series connection of the two switching elements 9a and 9b in the voltage converter 11 (see FIG. 2).

A terminal block 40 is adjacent to the stacked unit 29 in a −Y-direction. The output bus bars 4a to 4f are connected to the output terminals 303 of the semiconductor modules 3a to 3f, respectively. The output bus bars 4a to 4f pass through the terminal block 40. Ends of the output bus bars 4a to 4c (4d to 4f) configure power terminals 401a (401b) on a side surface of the terminal block 40. The semiconductor modules 3a to 3c configure the inverter circuit 12a, and three-phase alternating current is outputted from the output terminals 303 of the semiconductor modules 3a to 3c. The power terminals 401a, which correspond to the ends of the output bus bars 4a to 4c, are connected to a power cable (not illustrated). The power cable is connected to the motor 91a. The semiconductor modules 3d to 3f configure the inverter circuit 12b, and three-phase alternating current is outputted from the output terminals 303 of the semiconductor modules 3d to 3f. The power terminals 401b, which correspond to the ends of the output bus bars 4d to 4f, are connected to another power cable (not illustrated). The other power cable is connected to the motor 91b.

The afore-described current sensors 52a and 52b are embedded in the terminal block 40. FIG. 5 illustrates an internal structure of the terminal block 40. In FIG. 5, a main body 42 of the terminal block 40 is illustrated with a virtual line, while components in the main body 42 are illustrated with solid lines.

The current sensors 52a and 52b are configured by ring cores 7a to 7f surrounding the respective output bus bars 4a to 4*f* and Hall elements 5*a* to 5*f* arranged at notches of the respective ring cores. The current sensor 51 is configured by a ring core 7*g* surrounding the relay bus bar 37 and a Hall element 5*g* arranged at a notch of the ring core 7*g*. The current sensors 52*a* and 52*b* will be described below. The structure of the current sensor 51 is the same as that of the current sensor 52*a*, so a detailed description for the current sensor 51 is omitted.

Figure 5:
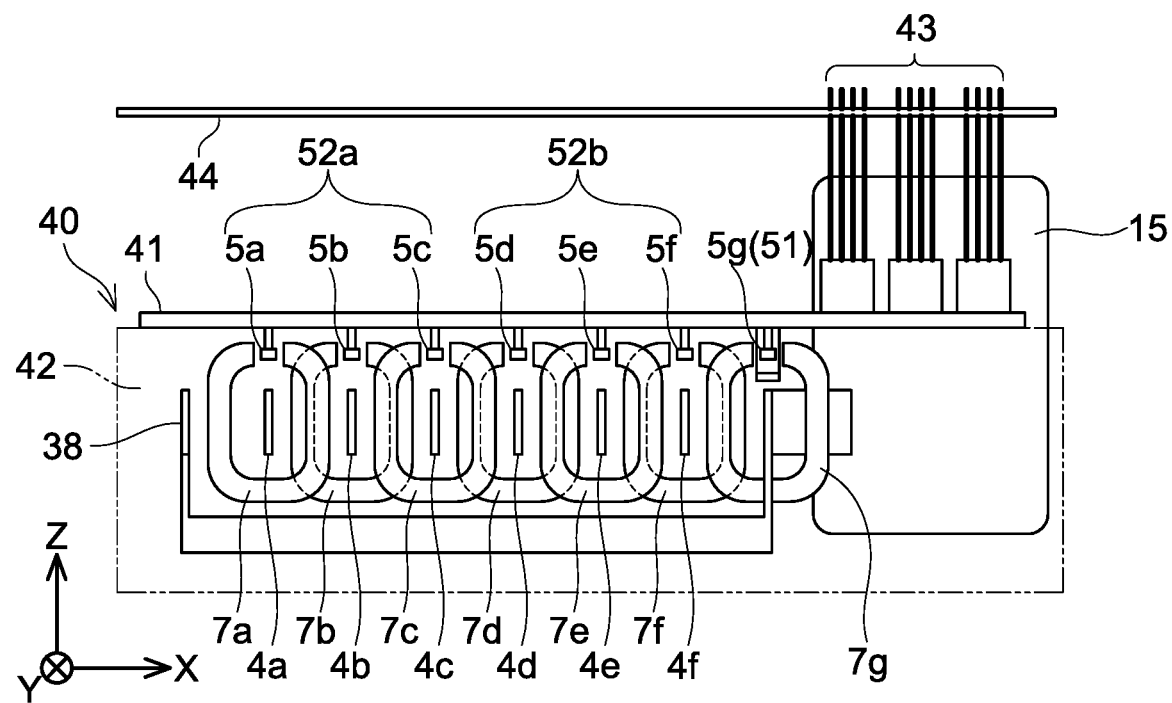
FIG. 5 illustrates an internal structure of a terminal block.

As illustrated in FIG. 5, the current sensor 52*a*, which measures currents respectively flowing through the output bus bars 4*a* to 4*c*, includes the ring cores 7*a* to 7*c* and the Hall elements 5*a* to 5*c*. The ring core 7*a* surrounds the output bus bar 4*a*. The ring core 7*a* is provided with a notch, and the Hall element 5*a* is arranged at the notch. The ring core 7*a* is constituted of a magnetic material. The ring core 7*a* collects magnetic flux generated by a current flowing through the output bus bar 4*a*. The Hall element 5*a* measures the magnetic flux that passes through the ring core 7*a*. The Hall element 5*a* is connected to a sensor board 41. A circuit that converts strength of the magnetic flux measured by the Hall element 5*a* to a magnitude of current flowing through the output bus bar 4*a* is mounted on the sensor board 41.

A pair of the ring core 7*b* and the Hall element 5*b* and a pair of the ring core 7*c* and the Hall element 5*c* have similar structures to the pair of the ring core 7*a* and the Hall element 5*a*. The ring core 7*b* (7*c*) surrounds the output bus bar 4*b* (4*c*), and the Hall element 5*b* (5*c*) is arranged in a notch of the ring core 7*b* (7*c*). The Hall element 5*b* (5*c*) is connected to the sensor board 41. A circuit mounted on the sensor board 41 obtains a magnitude of current flowing through the output bus bar 4*b* (4*c*) from strength of magnetic flux measured by the Hall element 5*b* (5*c*).

The current sensor 52*b* has the same structure as the current sensor 52*a*. The current sensor 52*b* includes the ring cores 7*d* to 7*f* and the Hall elements 5*d* to 5*f*, and measures currents that respectively flow through the output bus bars 4*d* to 4*f*. Strengths of magnetic flux measured by the Hall elements 5*a* to 5*f* are converted to magnitudes of currents flowing through the respective output bus bars by circuits mounted on the sensor board 41. Signal pins 43 that extend from the sensor board 41 are connected to the circuit board 44. Current values measured by the current sensors 52*a* and 52*b* are sent to the circuit board (the controller 6) via the sensor board 41 and the signal pins 43.

For convenience of description, hereinbelow, when any one of the current sensors 52*a* and 52*b* is referred to, it will be referred to as a current sensor 52. When any one of the output bus bars 4*a* to 4*f* is referred to, it will be referred to as an output bus bar 4. A Hall element corresponding to the output bus bar 4 will be referred to as a Hall element 5. A semiconductor module to which the output bus bar 4 is connected will be referred to as a semiconductor module 3, and switching elements accommodated in the semiconductor module 3 will be referred to as switching elements 9.

The switching elements 9 convert output electric power of the direct-current power source 13 to driving electric power for the motor 91*a* (91*b*). An output current of the switching elements 9 flows in the output bus bar 4. The current sensor 52 is attached to the output bus bar 4. Heat of the switching elements 9 transfers to the current sensor 52 via the output bus bar 4. A large load on the switching elements 9 increases the amount of heat generation, and a temperature of the current sensor 52 is thereby increased. Here, the temperature of the current sensor 52 more specifically means a temperature of the Hall element 5. If the current sensor 52 (the Hall element 5) becomes unusable because of overheating, it becomes difficult to appropriately control the motors 91*a* and 91*b*. Therefore, the controller 6 performs control for protecting the current sensor 52 from overheating. However, providing a dedicated temperature sensor for measuring the temperature of the current sensor 52 increases the cost of the power converter 2. The power converter 2 estimates the temperature of the current sensor 52 from a temperature of the coolant that cools the switching elements 9, an output current of the switching elements 9, and an input voltage applied to the switching elements 9. The controller 6 protects the current sensor 52 from heat based on the temperature of the current sensor 52 that has been estimated (an estimated temperature). The temperature of the coolant is obtained from the temperature sensor 24 (see FIG. 1). The output current of the switching elements 9 is obtained from the current sensor 52. The input voltage applied to the switching elements 9 is obtained from the voltage sensor 13 (see FIGS. 1 and 2).

Figure 6:
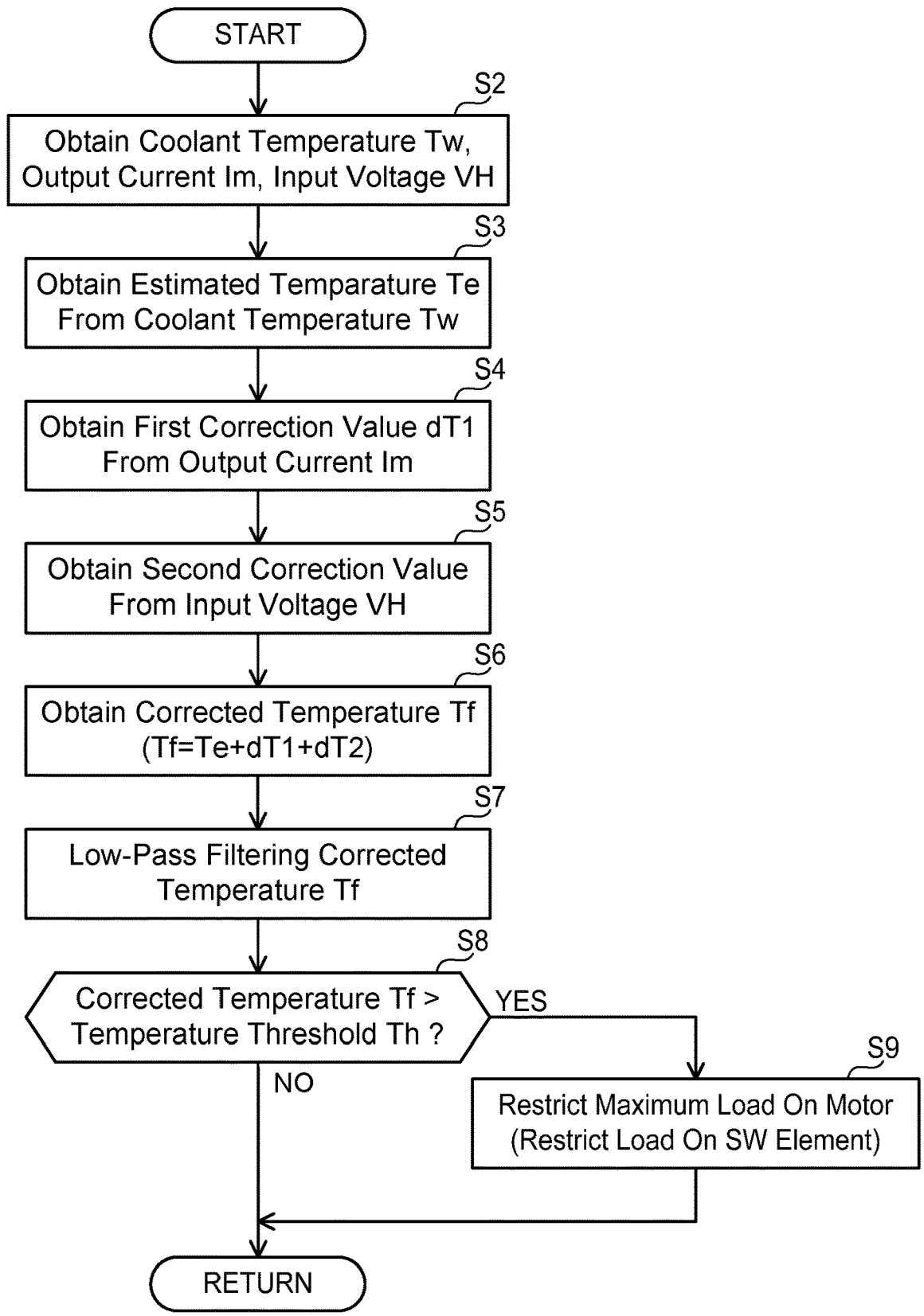
FIG. 6 is a flowchart of protection control.

FIG. 6 is a flowchart of a heat protection process performed by the controller 6. First, the controller 6 obtains a coolant temperature Tw, an output current Im, and an input voltage VH (step S2). As described before, these values are obtained from the temperature sensor 24, the current sensor 52, and the voltage sensor 18. The controller 6 then obtains an estimated temperature Te of the current sensor 52 from the coolant temperature Tw (step S3).

A method of obtaining the estimated temperature Te will be described. There are unique correspondence relations between the coolant temperature Tw and temperature of the current sensor 52, which are determined by the structure of the power converter 2. The controller 6 uses that correspondence relations to obtain the temperature of the current sensor 52 (the estimated temperature Te) from the coolant temperature Tw. Specifically, the controller 6 refers to a map (a first map) that represents the correspondence relations to obtain the estimated temperature Te from the coolant temperature Tw. The first map is stored in the controller 6 in advance. FIG. 7 illustrates an example of the first map. Estimated temperature Tex (x=1 to 9) corresponds to coolant temperature Twx (x=1 to 9), where "x" represents a number given after "Tw" and "Te" in the first map. Twx (x=1 to 9) with a larger number x indicates a higher temperature.

The estimated temperature Te is represented by a sum of a cooler contribution Tc and an atmospheric temperature contribution Ta (Te=Tc+Ta). The cooler contribution Tc represents an effect of the cooler 20 on the temperature of the current sensor 52. The atmospheric temperature contribution Ta represents an effect of an atmospheric temperature on the temperature of the current sensor 52. The cooler contribution Tc is determined from the structure of the power converter 2 and is predetermined by experiments and the like.

The atmospheric temperature contribution Ta is also determined from the structure of the power converter 2 and is predetermined by experiments and the like. In the power converter 2, the controller 6 controls the pump 22 of the cooler 20 based on the atmospheric temperature, so the coolant temperature Tw may change in accordance with the atmospheric temperature. Therefore, there are certain correspondence relations also between the coolant temperature Tw and the atmospheric temperature. That is, unique correspondence relations can be also established between the coolant temperature Tw and the atmospheric temperature contribution Ta in the first map. The atmospheric temperature is obtained from the temperature sensor 8 (see FIG. 1) included in the power converter 2. The control by the controller 6 on the cooler 20 based on the atmospheric temperature reduces an error included in the correspondence relations between the coolant temperature Tw and the atmospheric temperature contribution Ta, as a result of which the estimated temperature Te can be obtained with high accuracy from the coolant temperature Tw.

After obtaining the estimated temperature Te, the controller 6 obtains a first correction value dT1 for the temperature of the current sensor 52 (the Hall element 5) from the output current Im (step S4). With a larger output current Im, a current flowing through the output bus bar 4 is larger and the temperature of the current sensor 52 is higher. The first correction value dT1 corresponds to a temperature increase in the current sensor 52 based on the output current Im. There are unique and specific correspondence relations also between the output current Im and the first correction value dT1. This correspondence relations also depend on the structure of the power converter 2. The correspondence relations between the output current Im and the first correction value dT1 are also specified in advance.

The controller 6 uses these correspondence relations to obtain the first correction value dT1 from the output current Im. Specifically, the controller 6 refers to a map (a second map) that represents the correspondence relations between the output current Im and the first correction value dT1 to obtain the first correction value dT1 from the output current Im. FIG. 8 illustrates an example of the second map. First correction value dT1$x$ ($x$=1 to 9) corresponds to output current Im$x$ ($x$=1 to 9), where "$x$" represents a number given after "Im" and "dT1" in the second map. Im$x$ ($x$=1 to 9) with a larger number $x$ represents a larger current.

The first correction value dT1 is represented by a sum of a bus bar contribution Tb and a resin contribution Tr (Te=Tb+Tr). The bus bar contribution Tb represents temperature increase caused by heat due to the output current Im directly transferring from the output bus bar 4 to the current sensor 52. The resin contribution Tr represents temperature increase caused by heat due to the output current Im transferring to the current sensor 52 via the resin main body 42 of the terminal block 40. Correspondence relations among the bus bar contribution Tb, the resin contribution Tr, and the first correction value dT1 are also determined from the structure of the power converter 2, are set by experiments and the like, and are stored in the controller 6 in advance.

Next, the controller 6 obtains a second correction value dT2 for the temperature of the current sensor 52 from the input voltage VH (step S5). With a higher input voltage VH, the temperature of the current sensor 52 becomes higher. The second correction value dT2 corresponds to temperature increase in the current sensor 52 based on the input voltage VH. With a higher input voltage VH, the second correction value dT2 becomes larger. There are unique and specific correspondence relations also between the input voltage VH and the second correction value dT2. This correspondence relations also depend on the structure of the power converter 2. The correspondence relations between the input voltage VH and the second correction value dT2 are also specified in advance by experiments and the like.

The controller 6 uses these correspondence relations to obtain the second correction value dT2 from the input voltage VH. Specifically, the controller 6 refers to a map (a third map) that represents the correspondence relations between the input voltage VH and the second correction value dT2 to obtain the second correction value dT2 from the input voltage VH. FIG. 9 illustrates an example of the third map. Second correction value dT2$x$ ($x$=1 to 9) corresponds to input voltage VH$x$ ($x$=1 to 9), where "$x$" represents a number given after "VH" and "dT2" in the third map. VH$x$ ($x$=1 to 9) with a larger number $x$ represents a higher voltage.

The controller 6 adds the obtained first and second correction values dT1 and dT2 to the obtained estimated temperature Te to obtain a corrected temperature Tf (step S6). The corrected temperature Tf means a final estimated temperature of the current sensor 52.

The controller 6 performs low-pass filtering for the corrected temperature Tf (step S7). The low-pass filter may be a first-order filter or a second-order filter. The low-pass filter may simply be a moving average of the corrected temperature Tf.

Next, the controller 6 compares the corrected temperature Tf after low-pass filtering with a predetermined temperature threshold Th (step S8). When the corrected temperature Tf exceeds the temperature threshold Th, the controller 6 restricts the maximum load on the motors 91$a$ and 91$b$ (YES in step S8, and Step S9). Restricting the maximum load on the motors 91$a$ and 91$b$ means restricting a load on the switching elements 9. A term "SW element" in step S9 of FIG. 6 means "switching element". By restricting the maximum load on the motors 91$a$ and 91$b$ (that is, restricting the load on the switching elements 9), an upper limit of the output current Im or the input voltage VH is restricted. Therefore, the temperature increase in the current sensor 52 is suppressed, and overheating of the current sensor 52 is prevented. When the corrected temperature Tf does not exceed the temperature threshold Th, the controller 6 ends the process (NO in step S8).

As described above, the power converter 2 according to the embodiment can protect the current sensor 52 from overheating without using a dedicated temperature sensor for the current sensor 52.

There may be several types of means to restrict the load on the motors 91$a$ and 91$b$. In a case where the electric vehicle 100 is a hybrid vehicle, the load on the motors 91$a$ and 91$b$ may be restricted by increasing a contribution rate of an engine torque to a motor torque. Alternatively, prohibiting an engine from stopping in the hybrid vehicle also contributes to restriction on the maximum load on the motors.

Some of features related to the technique described in the embodiment will be listed below.

The coolant temperature is affected by the atmospheric temperature. Therefore, the estimated temperature that is specified based on the coolant temperature may be obtained with taking the atmospheric temperature into consideration. The controller of the power converter disclosed herein may be configured to control the cooler based on the atmospheric temperature. This reduces an error included in relations between the coolant temperature and the atmospheric temperature, and thus it may be possible to more accurately obtain the estimated temperature of the current sensor that is estimated based on the coolant temperature.

The relations between the coolant temperature and the estimated temperature, the relations between the output current and the first correction value, and the relations between the input voltage and the second correction value may be specified in advance based on the mechanical structure of the power converter. These relations may be represented by equations or in form of maps. The controller may store therein the first map that represents the relations between the coolant temperature and the estimated temperature, the second map that represents the relations between the output current and the first correction value, and the third map that represents the relations between the input voltage and the second correction value. In this case, the estimated temperature, the first correction value, and the second correction value may be obtained easily.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A power converter for an electric vehicle configured to convert output electric power of a power source to driving electric power for an electric traction motor, the power converter comprising:
    a switching element configured to convert the output electric power to the driving electric power;
    a current sensor provided on a bus bar in which an output current of the switching element flows and configured to measure the output current of the switching element;
    a cooler configured to cool the switching element;
    a temperature sensor configured to measure a temperature of a coolant for the cooler; and
    a controller configured to control the switching element, wherein
    the controller is configured to:
    estimate a temperature of the current sensor based on the temperature of the coolant;
    determine a first correction value for the estimated temperature based on the output current and determine a second correction value for the estimated temperature based on an input voltage applied to the switching element; and
    restrict a load on the switching element when a corrected temperature exceeds a predetermined temperature threshold, the corrected temperature being obtained by adding the first correction value and the second correction value to the estimated temperature.

2. The power converter of claim 1, wherein the controller is configured to control the cooler based on an atmospheric temperature.

3. The power converter of claim 1, wherein the controller stores a first map, a second map, and a third map, the first map representing a relation between the temperature of the coolant and the estimated temperature, the second map representing a relation between the output current and the first correction value, the third map representing a relation between the input voltage and the second correction value.

* * * * *